United States Patent [19]
Campbell

[11] Patent Number: 5,356,652
[45] Date of Patent: Oct. 18, 1994

[54] METHOD OF DISTRIBUTING BAKER'S DOUGH

[76] Inventor: Sterrett P. Campbell, 995 Peachtree Dunwoody Ct., Atlanta, Ga. 30328

[21] Appl. No.: 122,006

[22] Filed: Sep. 15, 1993

Related U.S. Application Data

[63] Continuation-in-part of Ser. No. 932,373, Aug. 19, 1992, Pat. No. 5,264,232.

[51] Int. Cl.$^5$ .............................. A21D 6/00
[52] U.S. Cl. .................... 426/503; 425/311; 426/517; 426/518
[58] Field of Search ............ 426/503, 504, 496, 516, 426/517, 518; 425/202, 204, 311

[56] References Cited

U.S. PATENT DOCUMENTS 4,948,611  8/1990  Cummins ..................... 426/503
5,070,185  12/1991  Stanko ........................ 528/502

*Primary Examiner*—George Yeung
*Attorney, Agent, or Firm*—Hopkins & Thomas

[57] ABSTRACT

A stream of dough passes from a metering pump (16) or (17) into the dough distribution manifold. The incoming stream of dough is sliced by the sharpened knife edge (64) of the divider knives (51) to form a pair of diverging streams of dough. Each diverging stream of dough is confronted with a second pair of divider knives (52) and (53), where a similar dividing function occurs. The positions of the knives are adjustable by external knobs (75) so as to balance the diverging streams of dough. The dough streams pass directly, in a line of sight, from the inlet openings (43) to the outlets (44A–44H), thereby avoiding the movement of dough about bends, turns, protrusions and obstructions which would deteriorate the gluten structure of the dough.

12 Claims, 3 Drawing Sheets

METHOD OF DISTRIBUTING BAKER'S DOUGH

CROSS REFERENCE TO RELATED APPLICATION

This is a continuation-in-part of U.S. patent application Ser. No. 07/932,373 filed Aug. 19, 1992, now U.S. Pat. No. 5,264,232.

FIELD OF THE INVENTION

The invention relates to the handling of baker's dough during a continuous dough handling process in which the dough is first mixed, then is pressurized in a stuffing pump, is separated into a plurality of streams of dough, and each dough stream is cut into segments of dough that are carried on a surface conveyor system during rounding, proofing and baking. More particularly, the invention relates to a distribution manifold which receives moving streams of dough and subdivides the dough into several diverging streams for delivery to a dough divider and rounder bar system.

BACKGROUND OF THE INVENTION

When baker's dough is mixed it is usually blended in a large mixer wherein the batch of dough developed in the mixer has a density of approximately 69 lbs. per cubic foot. The dough must then be transferred from the mixer to a stuffing pump whereupon the stuffing pump progressively pressurizes the batch of dough to form the dough into a stream that moves through conduits to subsequent dough handling equipment, such as a metering pump, a dough distribution manifold which distributes the stream of dough into multiple streams of dough, a dough divider which divides the streams of dough into globs of dough of equal weight, and onto a surface conveyor of a rounder bar system which forms the globs of dough into substantially rounded dough balls with a slightly developed skin which resists sticking to the down stream processing equipment.

Once the dough has been mixed, the dough begins to develop $CO_2$ and it expands or "rises" as it ages. As the dough is being handled by the prior art stuffing pumps and subsequent processing equipment leading to the dough divider, the dough is sheared, torn, stretched, held at elevated pressures and otherwise handled in a manner that tends to deteriorate the gluten structure of the dough. Maintaining a pliable gluten structure is important in providing a final product which has uniform grain structure since the gluten structure provides the walls of the small pockets that trap the $CO_2$ gas being formed which in turn provides the tight even grain structure desired for sliced bread and buns. Therefore, it is desirable in the handling of the stream of pressurized dough that the dough not be unnecessarily stretched, torn or sheared and held at elevated pressures.

Preferably, the stream of pressurized dough should pass through as few constrictions and changes of direction as is practical so as to avoid tearing, stretching and shearing and to avoid the requirement of high pressure to transport the dough and to avoid large pressure drops. Further, it is desirable to maintain the dough under high pressure for as short a period of time as is practical so as to avoid deterioration of the gluten structure.

A common practice for subdividing a stream of baker's dough moved by the stuffing pump of a dough handling system has been to move the stream of dough into a common manifold and exhaust the dough from several outlet ports of the manifold into separate conduits and to deliver the dough from the several conduits to a dough divider that continually slices each subdivided stream of dough into dough balls. One of the major problems with the prior art systems is the accurate control of the dough as it moves through the manifold and to the dough divider. It is important that the dough be delivered through each conduit to the dough divider at substantially equal masses for a given time period so that when the streams of dough are separated into dough balls by the dough divider, each dough ball will be of a predetermined mass that is suitable for subsequent rounding, proofing and baking to yield baked products all of which are of uniform size, shape, consistency and weight.

The method practiced by the prior art generally comprises the installation of valves in each conduit leading away from the dough distribution manifold toward the dough divider. When the operator of the system detects too much or too little dough moving through one of the conduits, the valve for that conduit is adjusted to adjust the dough flow through the conduit.

For example, when a valve is moved more toward its closed position to further constrict the passage of the conduit, the rate of dough moving from the manifold through the valve to the divider decreases and the back pressure of the dough stream leading toward the valve increases, which leads to increased back pressure in the distribution manifold and in the adjacent valves of the other discharge conduits. Usually, this causes an increased flow through the adjacent conduits but not through the remote conduits. Therefore, in order to adjust the flow of dough through one conduit, the system operator usually is required to adjust the valves of at least the adjacent conduits, and possibly other valves of the distribution system. Further, the presence of so many valves to control the system increases the constrictions in the flow paths of the dough and, therefore, increases the amount of pressure required to drive the system. Further, the placement of valves in each delivery conduit where the cross section of the dough is relatively small generally functions to cause a relatively high pressure drop across the valve, thereby requiring increased back pressure to force the dough past all the valves, and comprising a constriction in each dough path that causes the dough to change shape and direction of movement.

An example of a prior art dough stream control system is found in U.S. Pat. No. 4,948,611 which teaches that each of the dough streams be fine tuned by means of throttling valves in each delivery conduit.

In addition, the typical prior art dough distribution manifolds require the dough, and therefore the gluten strands that are interconnected throughout the dough mass, to be torn apart as the dough is divided from the inlet stream into several outlet streams to the dough divider. The tearing of the gluten strands causes deterioration of the gluten strands at the point of rupture as well as requiring greater back pressure to provide the energy to tear the strands. The higher required pressures cause the gluten to age rapidly and increases the dough temperature, the first result causing a deterioration of final product quality and the second making it more difficult to "machine" (round, shape and mold) the final dough ball.

Further, it is important that all of the dough in the final product proceed through a uniform environment during dough processing, proofing and baking phases. As shown by the cited prior patent, the prior art dough distribution manifolds require the dough to proceed different distances from the entrance of the manifold in different directions to the outlets of the manifold, and along conduits of differing lengths and varying back pressures and varying residence times to reach the dough divider. The result is a significant variation in product from the outlets of the different conduits.

Therefore, it can be seen that it would be desirable to provide a distribution system for baker's dough that separates the stream of dough leading from the stuffing pump toward the dough divider into a plurality of dough streams that are of equal mass and velocity and with lower driving pressure and lower pressure drop of the dough as the dough moves through the system.

SUMMARY OF THE INVENTION

Briefly described, the present invention comprises a method and apparatus for distributing baker's dough in a dough processing system in which a stream of dough moves from a mixer and stuffing pump, through a distributor and multiple delivery outlets, through a dough divider, and to a conveyor for rounding, proofing and baking. A dough distribution manifold used as part of this system comprises a housing defining a dough distribution chamber, an inlet opening in communication with the distribution chamber for guiding a stream of dough to the distribution chamber and a plurality of dough outlets also in communication with the distribution chamber. A dough piercing sharp in the form of a sharp edged knife is positioned in the distribution chamber in alignment with the entering dough stream, and the sharpened edge of the knife faces the inlet opening for slicing and separating the dough into diverging streams of dough, causing the diverging streams to follow separate paths through the distribution chamber, without undue tearing of the gluten structure of the dough.

A second set of similar dough piercing sharps are positioned in the distribution chamber, downstream from the first dough piercing sharp, with the second sharps being in alignment with the diverging dough streams for slicing and separating the diverging dough streams into a second set of diverging dough streams, so that the multiple dough streams each move to the dough outlets of the housing and on to the dough divider and subsequent equipment.

A significant feature of the invention is that the dough distribution chamber and the dough piercing sharps are arranged so that the dough streams each follow a substantially direct path along a "line of sight" from upstream the first dough piercing sharp to a position downstream of its last dough piercing sharp, so that the streams of dough move along a line of sight without traversing any significant turns or other obstructions, thereby tending to preserve the strands of the dough gluten structure, tending to avoid the friction and heat that would be generated by the turns, obstructions, etc., tending to avoid stretching of the dough and the requirement of providing increased back pressure to force the dough past the turns, protrusions, etc. It is specifically noted that dough does not exhibit the typical hydraulic system principle of equal pressure in all directions but appears to maintain pressure along straight lines of sight while down stream locations shaded by curves or protrusions tend to suffer a far greater pressure drop than the areas directly adjacent that are within the line of sight. Because uneven pressure provides uneven results, maintaining line of sight is important. As an example, a tuned manifold where all the paths are exactly equal will yield uneven flows with those paths that are "less" in the line of sight, providing significantly less flow even though the configuration of the various paths are alike.

Preferably, the line of sight of the dough streams extends from the inlet opening for the entering dough stream to each of the multiple delivery outlets from the distribution chamber. Further, it is desirable and is a feature of the preferred embodiment of the invention that the distance from the piercing edge of the first dough divider sharp to each of the multiple delivery outlets is substantially the same. This results in substantially the same amount of surface friction, delay time and generated heat being experienced by the dough during its passage through the distribution chamber.

The sharps used as the dividers for separating an oncoming stream of dough into two diverging streams of dough are pivotable knives with rectilinear sharpened edges facing the oncoming dough, and with a remotely located pivot support. The knives can be tilted about their pivot support from outside the housing by the rotation of knobs by the operator so as to reposition the sharpened edges of the knives and therefore adjust the weight of the dough passing in each diverging dough stream beyond the knives. This ultimately adjusts the weight of the dough passing per unit of time through the multiple delivery outlets and on to the dough divider, so that each dough ball formed by the system is of substantially equal weight.

Another feature of the invention is a transparent wall section of said housing which enables the operator of the system to visually inspect the movement of the dough through the dough distribution manifold, and to observe any malfunctions or obstructions of the system which may occur in the dough distribution manifold.

A further feature of the invention is a cooling system embodied in the dough distribution manifold wherein cooling liquid is circulated in the walls of the dough distribution manifold so as to extract heat from the portions of the dough in contact with the interior walls of the dough distribution chamber. This enables the operator to regulate the temperature of the dough both inside the distribution chamber as well as in the subsequent dough divider, so that the dough balls formed by the subsequent dough divider and rounder bar system can be at the optimum temperature which avoids significant clinging of the dough to the conveyor of the rounder bar system.

Thus, it is an object of this invention to provide an improved baker's dough handling system that is simple in design, inexpensive to construct, durable, and which is easy to control.

Another object of this invention is to provide a baker's dough distribution manifold which applies a minimum of resistance to the flow of baker's dough as the dough moves from a stuffing pump to a dough divider and rounder bar system, and which avoids unnecessary disruption of the gluten structure of the dough and requires a minimum of back pressure and pressure drop as the dough is distributed.

Another object of the invention is to provide an improved baker's dough distribution manifold which minimizes the stretching and tearing of the dough, minimizes the back pressure required to urge the dough through the system and minimizes the adjustments that the operator must make to the system to achieve a balanced dough delivery system.

Another object of the invention is to provide a dough distribution system that divides an oncoming stream of baker's dough into multiple diverging streams of dough in lines of sight paths, so as to minimize the turns, curves and obstructions about which the streams of dough must travel.

Other objects, features and advantages of the present invention will become apparent upon reading the following specification, when taken in conjunction with the accompanying drawings.

DETAILED DESCRIPTION

Figure 1:
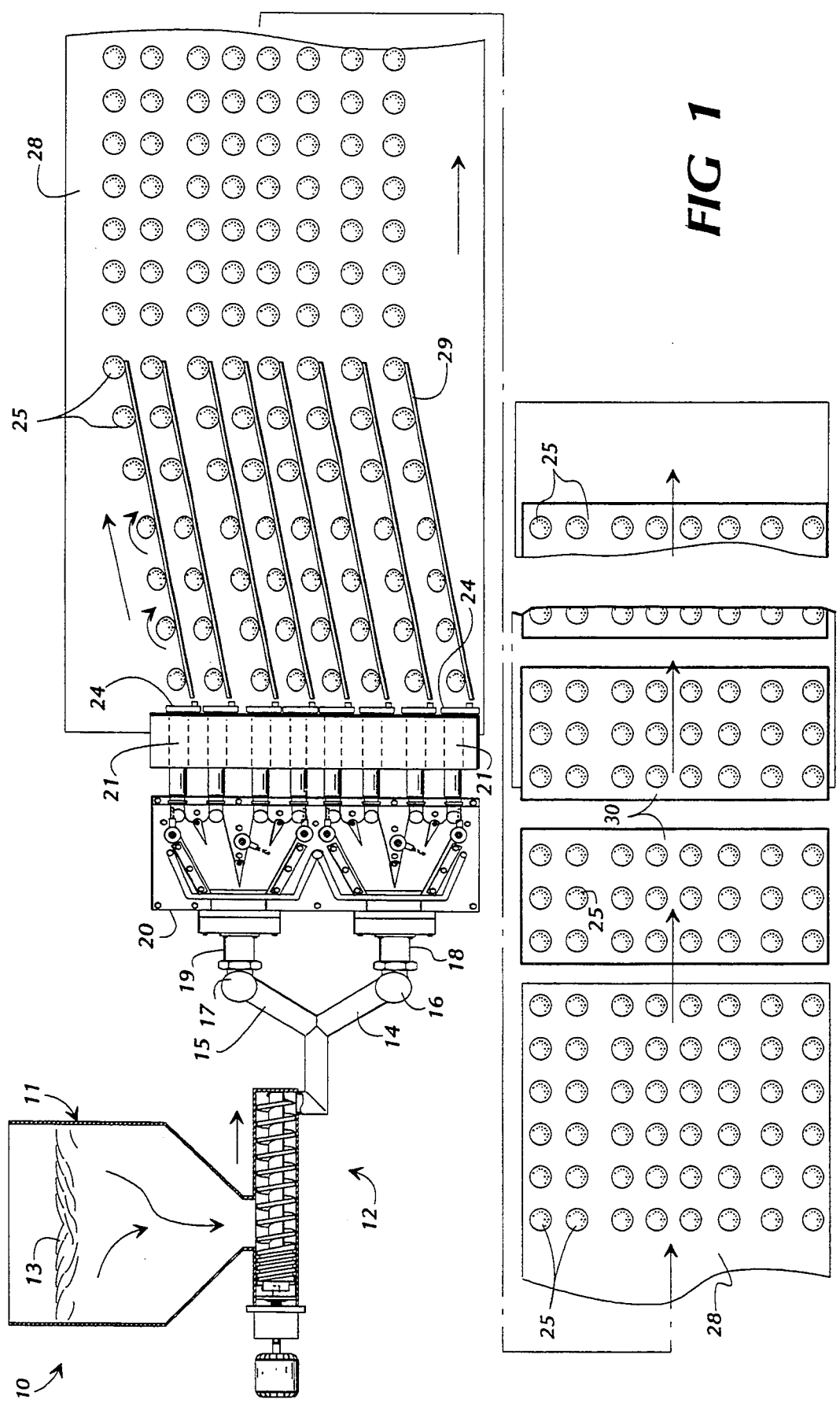
FIG. 1 is a schematic illustration of the dough handling system, showing the stuffing pump, metering pumps, distribution manifold, dough divider, rounder bars and conveyor system, and the baking pans which receive the dough balls.

Referring now in more detail to the drawings, in which like numerals refer to like parts throughout the several views, FIG. 1 illustrates a flow diagram of a dough handling system 10 which shows the progress of baker's dough as it is received from the mixer (not shown) and delivered to the baking pans. The dough 13 is received from the mixer in a hopper 11 of the dough stuffing pump 12, in which the dough is degassed and compressed. A stuffing pump suitable for this purpose is disclosed in my co-pending U.S. Pat. No. 5,283,074. The dough 13 is delivered from the stuffing pump in a stream which can be subdivided into one or more conduits 14 and 15, each of which leads to a metering pump 16 and 17. The metering pumps 16 and 17 are each regulated so as to pass a specific weight of dough per given interval of time. From the metering pumps 16 and 17, the dough is passed through conduits 18 and 19 to dough distribution manifold 20. The details of the dough distribution manifold will be described hereinafter. The dough is distributed from the manifold to each of a plurality of equal length conduits 21 and passed to a dough divider 24 which divides each stream of dough into globs of dough which become dough balls 25. A dough divider suitable for performing this function is disclosed in my co-pending U.S. Pat. No. 5,270,070.

The dough globs leaving the dough divider 24 are deposited on the surface conveyor 28, and each line of dough globs is engaged by a stationery rounder bar 29 which deflects and rolls the globs of dough with respect to the moving conveyor surface 28, thereby forming a skin on the surface of the dough globs and forming the dough globs into substantially spherical shapes. Rounder bar systems suitable for performing this function are found in U.S. Pat. Nos. 4,306,850 and 4,008,025.

The dough balls are passed from the surface conveyor 28 to baking pans 30 and the baking pans are conveyed through an open ended oven so as to cook the dough.

Figure 2:
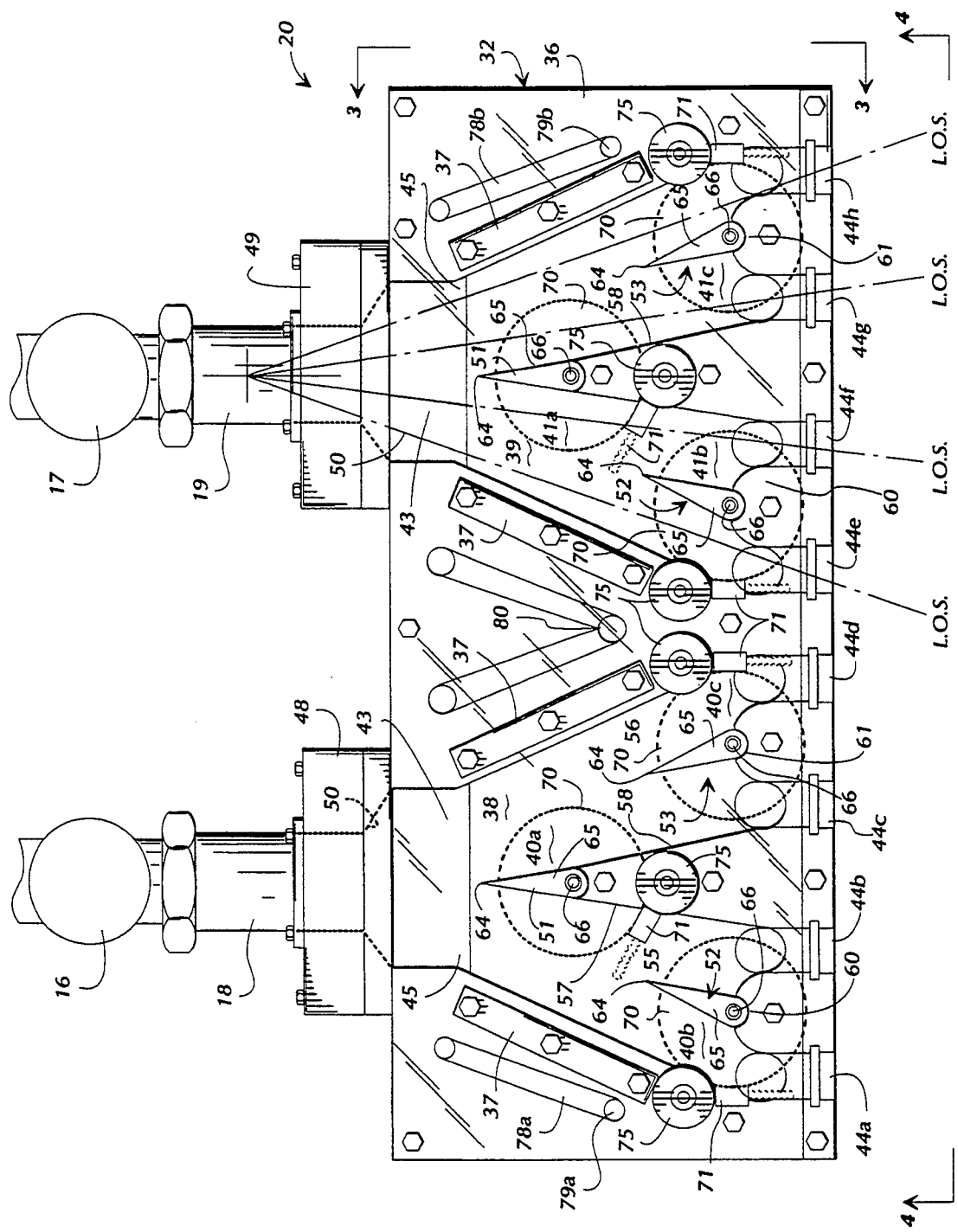
FIG. 2 is a plan view of the dough distribution manifold.
Figure 3:
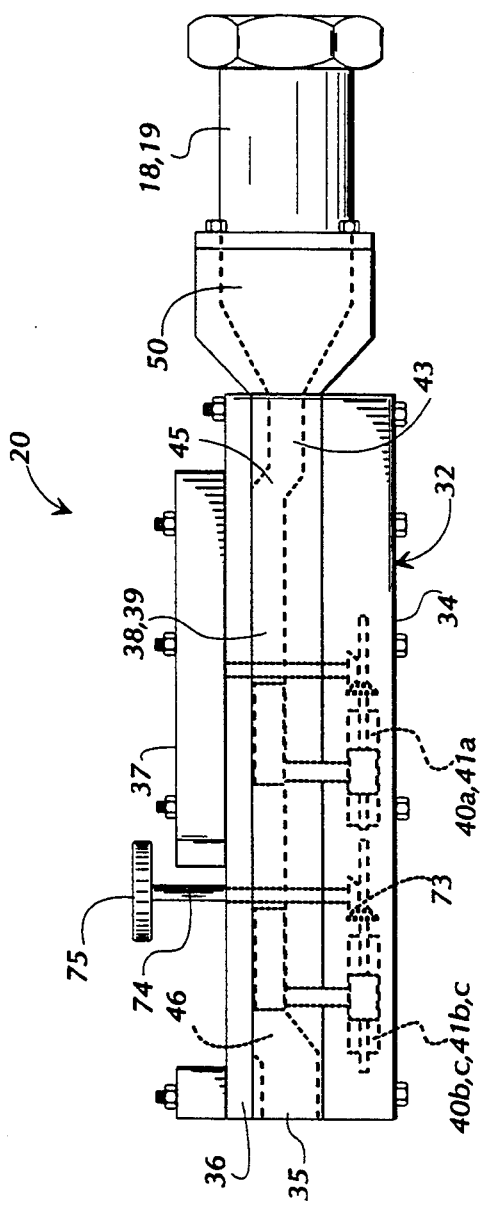
FIG. 3 is an end, cross-sectional view of the dough distribution manifold, taken along lines 3—3 of FIG. 2.
Figure 4:
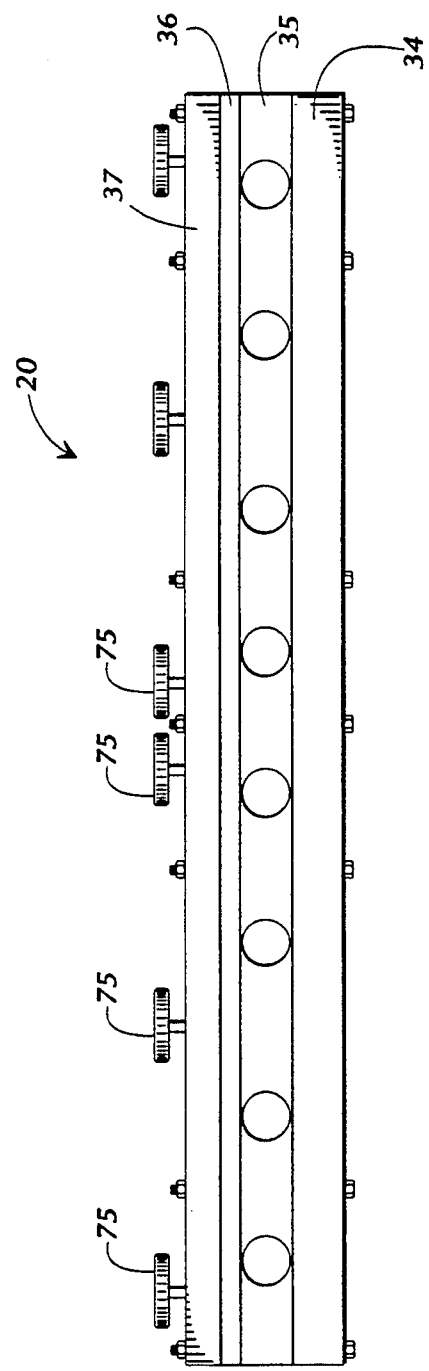
FIG. 4 is a side view, showing the delivery end wall of the dough distribution manifold, taken along lines 4—4 of FIG. 2.

As illustrated in FIGS. 2-4, dough distribution manifold 20 includes a rectangular housing 32 comprising a back wall 34, an intermediate wall 35, a transparent wall 36 and braces 37 which clamp the transparent wall 36 against the intermediate wall 35 so as to rigidify the transparent wall.

Back wall 34 and intermediate wall 35 of housing 32 both include cut-out portions which form cavities within the laminated wall assembly that forms the housing. Dough distribution chambers 38 and 39 are formed in intermediate wall 35 and gear chambers 40A, 40B, 40C, 41A, 41B and 41C are formed in back wall 34. As illustrated in FIG. 3, the inlet 43 and outlet 44 are positioned intermediate the side surfaces of the intermediate wall and the dough distribution chambers 38 and 39 have dog legs 45 and 46 so that the main portions of the dough distribution chambers merge with the transparent wall 36 and the transparent wall 36 becomes the outer partition of the dough distribution chambers 38 and 39 in housing 32. Conduits 18 and 19 leading from metering pumps 16 and 17 pass the streams of dough through a transition block 48 and 49. The transition blocks 48 and 49 each define a transition passageway 50 which merges from a circular shape adjacent the circular conduits 18 and 19 to a thin, wide-spread, non-circular shape entering the dog legs 45 and 46 and the dough distribution chambers 38 and 39.

Each dough distribution chamber 38 and 39 includes a first divider sharp 51 and a pair of second divider sharps 52 and 53. Dough distribution chambers 38 and 39 are each formed in an approximate pants leg shape, in that divider sharps 52 and 53 are located in what would be the leg portions 55 and 56 of the pants shape, whereas the first divider sharp 51 is located above the crotch portion 57 of divider wall 58 of the dough distribution chambers. Divider wall 58 forms the protrusion or crotch of the pants leg shape.

Each leg portion 55 and 56 defines a secondary pants leg shape, with the outlet openings 44A-44H communicating with the legs of the pant leg shapes, and with the divider walls 60 and 61 forming subsequent crotch portions of the pants leg.

First divider sharps 51 are positioned immediately above the divider wall 58. The first divider sharps 51 are shaped in the form of a wedge-shaped sharpened edge flat bladed knife having a sharpened rectilinear edge 64 facing inlet opening 43, and a wider base portion 65. A pivot pin 66 extends through the wider base portion 65 of each knife blade and can be rotated to control the position of each knife blade. The wider base portion 65 butts against the divider wall 58 so that the knife blade forms an extension of the divider wall. The first knife blade 51 is of a dimension to fill the cavity which forms the dough distribution chamber 38 or 39 of the intermediate wall 35, thereby forming a central partition with the divider wall 58. Second divider sharps 52 and 53 are similarly shaped as wedge shaped sharpened edge flat bladed knives and each also comprises a sharpened rectilinear edge 64, a wider base portion 65, and pivot pin 66. The wider base portions 65 of the second knife blades 52 and 53 butt against divider walls 60 and 61, respectively.

A bull gear 70 is positioned in each gear chamber 40A-C and 41A-C of the back wall 34, and the pivot pin 66 of each knife 51, 52, and 53 forms the axle of a bull gear, so that each knife turns in unison with its bull gear 70. The peripheral teeth (not shown) of each bull gear 70 are engaged by a worm screw assembly 71 so that rotation of the worm screw assembly 71 tilts the knife 51-53. An end portion of each worm screw assembly 71 includes mating beveled gears 73 (FIG. 3) with one of the gears being mounted at the end of control shaft 74. The control shaft 74 protrudes through aligned openings of the intermediate wall 35 and transparent wall 36, and external knob 75 is mounted to the protruding end of the control shaft. With this arrangement, an operator can turn the external control knob 75 of one of the divider knives 51-53, and the rotary movement imparted by the knob 75 through the beveled gear 73 to the worm screw assembly 71 causes the bull gear 70 to turn on its axle 66 so that the rotary movement of the axle displaces the sharpened knife edge 64 left or right, to turn the knife 51-53 so as to displace the knife edge 64 farther left or farther right within the dough distribution chamber 38 or 39.

In order to control the temperature of the dough passing through the dough handling system, internal cooling channels 78A and 78B are formed in the intermediate wall 35 of the housing 32. A pair of water coolant entrances 79A and 79B are located near the ends of the housing, and cooling channels 78A and 78B extend from one side to the other side of the dough distribution chambers 38 and 39 to the water coolant exit 80 which is located between the ends of the housing.

The back wall and intermediate wall of the housing are fabricated of aluminum or other metallic substances which readily transfer heat, so that the heat of the dough that contacts the inside surfaces of the dough distribution chambers 38 and 39 is rapidly dissipated from the dough to the cooling liquid. The transparent wall 36 is fabricated of lexan or other suitable transparent material. Typically, the dough enters and leaves the dough distribution chambers 38 and 39 at about the same temperature with the chilled water extracting the heat that is built up during passage. Preferably, the dough streams are delivered to the dough divider 20 (FIG. 1) at between 79° F. and 82° F.

OPERATION

When the dough handling system 10 (FIG. 1) is placed in operation, the dough 13 in hopper 11 is moved by stuffing pump 12 through the conduit systems to metering pumps 16 and 17, and the metering pumps adjust the flow of the dough streams so that a predetermined weight of dough is delivered for a given time period.

As the dough streams are delivered from the metering pumps 16 and 17 to the dough distribution manifold 20, the dough streams are reconfigured from a circular cross-sectional shape to a thin, non-circular shape having its long cross-sectional shape extending transverse to the rectilinear edge 64 of the first knives 51 (FIG. 2). The dough moves along lines of sight, schematically indicated on FIG. 2 as L.O.S., directly from the inlet opening 43 of each dough distribution chamber toward outlet openings 44A-D or 44E-H, respectively, of the dough distribution chambers 38 and 39.

As the stream of dough enters the dough distribution chambers 38 and 39, the first knives 51 slice the dough into a pair of diverging streams that straddle the first knives 51 and the divider walls 58. The diverging streams of dough move through the pant legs portion of the dough distribution chambers toward the outlet openings 44A-44H. The diverging streams of dough then are confronted with the second knives 52 and 53 which perform a similar function of slicing the diverging streams of dough into second diverging streams of dough. The second diverging streams of dough move in straddling relationship on opposite sides of the knives 52 and 53 and divider walls 60 and 61 toward outlet openings 44A-44H, and then through the outlet openings onto the dough divider 24. The diverging streams of dough are not required to move around turns, bends or protrusions as these streams of dough are subdivided from the entrance stream to diverging streams and then from the diverging streams to secondary diverging streams. Further, the sharpened knife edges 64 of each knife avoids stretching and tearing of the dough as the dough is subdivided in the dough distribution manifold 20.

In order to balance the system, the metering pumps 16 and 17 are set to provide equal weights of dough per unit of time to the dough distribution chambers 38 and 39. Once the entering dough stream has been established by the metering pumps, the operator can visually inspect the passage of the dough through the dough distribution chambers, and the operator can adjust the positions of the knives 51-53 by rotating the external knobs 75. The knobs, through the beveled gears 73 and worm screw assemblies 71, rotate the bull gears 70, and the bull gears change the positions of the knife edges 64, moving the knife edges 64 either right or left as shown in FIG. 2 so as to change the dividing position of the incoming dough stream. For example, if the knife edge 64 of knife 51 is moved slightly to the left, less dough will be delivered on the left side of the knife and more dough will be delivered on the right side of the knife. Likewise, if one of the knives 52 or 53 is adjusted by turning a knob 75, the weight of dough per unit of time delivered to its outlet openings will be changed.

The system has an advantage in that by adjusting one of the first knives 51, no change is made to the other side of the system, in that the opposite dough distribution chamber will not be affected. Likewise, when one of the knives 52 or 53 is adjusted, the opposite dough stream is not affected. The only dough streams affected by changing the position of the knife are those dough streams diverging from that knife. This allows the operator to maintain a substantially balanced dough distribution system for all those dough delivery conduits that are not being adjusted.

Should the operation of the dough distribution manifold malfunction because of an obstruction in a dough distribution chamber or because of inadvertent misposition of a divider knife, the operator can visually inspect the dough distribution chambers by looking through the transparent wall 36, so as to determine the cause of the malfunction and the operator may be able to correct the malfunction without being required to guess the cause of the malfunction.

While the foregoing disclosure sets forth a system having eight dough delivery outlets, a unit providing four streams of dough would be accomplished by using only one metering pump and one side or one-half of the distribution system described above. A unit providing six streams of dough would have one metering pump and side-by-side in feed sharps that would divide the on coming dough stream into three parts such as a three legged pair of pants with two crotches dividing the three legs. Each of the three legs would then be divided by a down stream sharp to provide the six dough extrusions. By properly combining the sharps positions with proper channel cross section and maintaining essentially equal length lines of site, any number (equal or odd) extrusion points could be established.

While the invention has been disclosed as distributing baker's dough, it should be apparent to those skilled in the art that other viscous materials can be distributed by the disclosed invention. Further, while a preferred embodiment has been disclosed in detail in the foregoing description and drawing, it will be understood by those skilled in the art that variations and modifications thereof can be made without departing from the spirit and scope of the invention as set forth in the following claims.

I claim:

1. A method of distributing baker's dough from a single stream of dough into separate streams of dough of substantially equal weight comprising:

moving a stream of dough toward a first dough separating sharp, separating the stream of dough into two diverging streams of dough with the first dough separating sharp, moving each of the two diverging streams of dough toward second dough separating sharps, separating each of the two diverging streams of dough into four streams of dough with the second dough separating sharps, and adjusting the positions of the first and second dough separating sharps and the diverging streams of dough with respect to each other to control the amount of dough moving in the separated streams of dough.

2. The method of claim 1 and wherein said first and second dough separating sharps comprise pivotably mounted knife blades having a sharpened edge facing the oncoming streams of dough, and wherein the step of adjusting the first and second dough separating sharps and the streams of dough comprises pivoting the knife blades to change the positions of their sharpened edges.

3. The method of claim 1 and wherein the steps of moving and separating the streams of dough comprise moving the streams of dough along lines of sight from a position ahead of the first dough separating sharp to positions past the second dough separating sharps.

4. The method of claim 1 and further including the step of cooling the dough as the dough is separated.

5. The method of claim 1 and further including the step of moving the separated streams of dough through conduits of substantially equal length to a dough divider, and dividing the streams of dough with the dough divider into dough balls of substantially equal weight.

6. The method of claim 1 and wherein the step of moving a stream of dough toward a first dough separating sharp comprises transferring dough from a mixer to a stuffing pump, pumping the dough with the stuffing pump to a metering pump, controlling the rate of flow of the dough in the metering pump as the dough moves toward the first separating sharp, as the dough moves toward the first separating sharp forming the dough in a thin, non-circular cross-sectional shape.

7. The method of claim 1 and wherein the step of adjusting the positions of the first and second dough separating sharps and the streams of dough comprise changing the positions of the sharps while the dough is being distributed.

8. A method of distributing baker's dough from a single stream of dough into a plurality of streams of dough of substantially equal weight comprising:

passing the stream of dough toward a first dough dividing sharp, dividing the stream of dough with the first dough dividing sharp to form the dough into diverging streams of dough, passing the diverging streams of dough along lines of sight from the first dough dividing sharp, past second dough dividing sharps and toward dough delivery outlets, and as the diverging streams of dough pass from the first dough dividing sharp toward the dough outlets, dividing the diverging streams of dough into second diverging streams of dough.

9. The method of claim 8 and wherein each step of dividing the streams of dough comprises:

moving a stream of dough about a sharpened edge of a dough divider blade and adjusting the position of the dough divider blade with respect to the stream of dough to adjust the weight of the diverging streams of dough.

10. The method of claim 8 and further including the step of cooling the streams of dough as the streams of dough are divided.

11. The method of claim 8 and wherein the steps of dividing the streams of dough comprise dividing the dough in a chamber having a transparent wall.

12. The method of claim 8 and wherein the step of passing a stream of dough toward a first dough dividing sharp comprises forming the dough in a thin, non-circular cross-sectional shape, and wherein the steps of dividing the streams of dough comprise passing thin non-circular streams of dough in a straddling relationship about sharpened edges of dough divider blades and adjusting the positions of the dough divider blades and the streams of dough with respect to each other to adjust the weight of the diverging streams of dough.

* * * * *